Aug. 29, 1961  D. O. NOORLANDER  2,997,980
TEAT CUP INFLATION

Filed Jan. 13, 1960  2 Sheets-Sheet 1

Inventor
Daniel O. Noorlander
By [signature]
Attorney

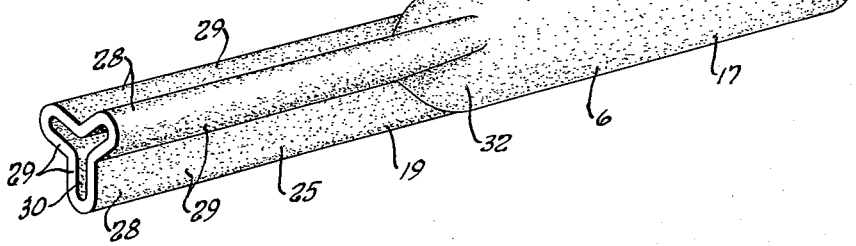
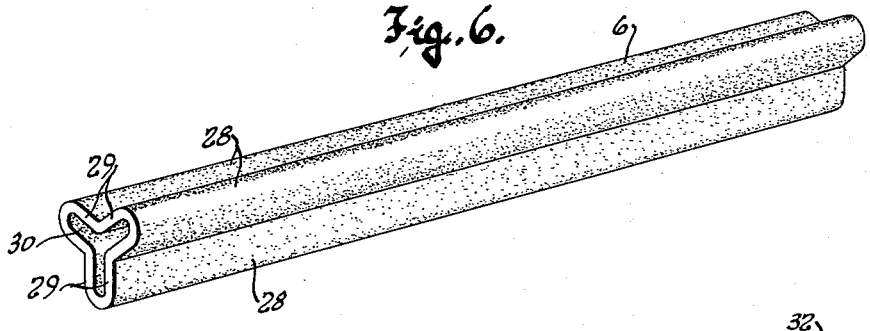
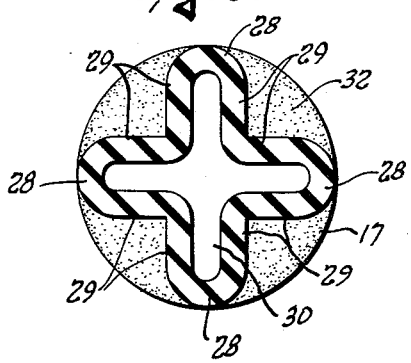

United States Patent Office 2,997,980
Patented Aug. 29, 1961

2,997,980
TEAT CUP INFLATION
Daniel O. Noorlander, 12704 Oaks, Chino, Calif.
Filed Jan. 13, 1960, Ser. No. 2,273
9 Claims. (Cl. 119—14.52)

This invention relates to milking machines, and has more particular reference to improvements in teat cups for such machines.

As is well known, the teat cups of milking machines are characterized by a rigid, substantially tubular outer metallic shell, and a resiliently flexible tubular liner or inflation inside the shell, usually made of substantially soft rubber or the like. The ends of the liner are sealed to the wall of the shell and the intermediate portions of the liner or inflation are in radially spaced concentric relation to the shell.

In use, such cups are applied to the teats of a cow to be milked with the teats received within the upper portions of the liners or inflations. The lower end of each liner is connected with a vacuum line, as is the space around the liner, and milk is caused to be withdrawn from the teats under the influence of vacuum in the liner. Atmospheric air is periodically let into the space inside the shell around the inflation to cause the latter to collapse and thereby achieve the massaging action upon the teats which is so essential to proper milking.

Although this collapsing action of the liners or inflations has nothing to do with the actual withdrawal of the milk from the cow—suction alone being sufficient for this purpose—unless the suction is periodically interrupted and the end of the teat is gently massaged to maintain blood circulation in the teat, serious consequences can result. Moreover, it has now been found that when certain undesirable features characterize the collapsing action, they can be one of the main causes of mastitis that seriously decreases milk production from otherwise healthy cows. The organic affliction brought on by improper milking technique is known as "non-specific" mastitis, and is not a disease or infection but an inflammation or irritation of the tissues in the cow's udder or teats resulting from injuries thereto, usually occurring during milking. Non-specific mastitis is particularly troublesome because it is difficult to detect, cannot be corrected by the administration of antibiotics, and usually paves the way for the more serious infectious forms of mastitis.

The present invention is based upon the discovery that certain types of collapsing action must be rigorously avoided in the teat cup liners or inflations of milking machines in order to prevent non-specific mastitis, and that those undesirable types of action are so prevalent in past cup liners that milking machines have been responsible for much of the non-specific mastitis found in commercial dairy herds.

One such undesirable type of action is the periodic collapse of the liners upon the teat ends with severe and injurious impact and/or pinching forces.

In other instances, the liners were so designed and constructed that a substantial space below the teat end inside the liner was inevitable. Such space leads to the objectionable impact upon and pinching of the teat end. In addition, it creates a situation in which at the end point of milking or prior to milk "let down," when a slightly negative pressure obtains in the teat canal, collapse of the liner pumps milk and air back into the teat cavity, along with any pathogenic organisms present in the milk. This is especially likely to happen where the wall of the teat near its end is rendered relatively rigid by congestion. In this condition the teat cannot yield to the increase in pressure and, as a result, the entrance to the teat canal remains open, thus greatly increasing the possibility of germ laden milk from infected animals or equipment being "pumped" back into the teats of healthy animals.

Accordingly, it is the primary purpose of this invention to provide a teat cup liner or inflation, which overcomes the above noted objections, and which insures a milking action that cannot cause injury to the teat.

More specifically, it is an object of this invention to provide a teat cup inflation that acts to stabilize and confine vacuum to the teat end during the milking operation, and which, during periodic collapse, minimizes the application of force to the teat end, while affording proper massage thereof, and thus assures against the application of injurious impact and/or pinching forces to the teat end.

A further object of this invention is to provide a teat cup inflation in which the foregoing objectives are attained through the use of a liner having a small bore that assures a snug fit around the teat at all times during the milking operation, regardless of teat shape or size, so that that part of the inflation above the portion thereof in which the end of the teat is located is rarely evacuated or at a negative pressure, but which, nevertheless, allows the teat to expand under milk pressure to the extent necessary to assure that the upper internal teat system will open and milk will flow into the teat proper for removal by vacuum.

Still another object of the invention resides in the provision of a teat cup inflation of the character described, which is so designed and constructed that the portion of the inflation not occupied by the teat, or, in other words, the portion of the inflation below the teat end, encloses only a minimum of internal space with walls so disposed that they yield to slight pressure, to thus assure complete and prompt closure of the inflation below the teat end every time the pulsator disconnects the space around the inflation from the vacuum source, even though the vacuum drops to a low level.

In a specific sense, a teat cup liner or inflation capable of achieving the aforementioned objectives may be provided with a small, smooth-bore upper sleeve portion to snugly receive the teat of an animal, gradually joined or connected to a lower non-circular portion which has its wall deformed inwardly to provide three circumferentially equispaced, narrow, lengthwise extending internal passages that communicate with one another on the axis of the inflation and radiate outwardly therefrom. This construction in effect provides three sections of the liner below the teat end which collapse as a consequence of only slight movement of the walls defining the narrow passages to assure against pinching the teat end and to minimize the volume of compressible rarefied air in the liner.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

FIGURE 5 is a perspective view of the inflation per se;

FIGURE 6 is a perspective view of a slightly modified form of inflation;

FIGURE 7 is a fragmentary perspective view showing still another form of inflation; and FIGURE 8 is a cross sectional view similar to FIGURE 3 but illustrating a further embodiment of the invention.

Figure 1:
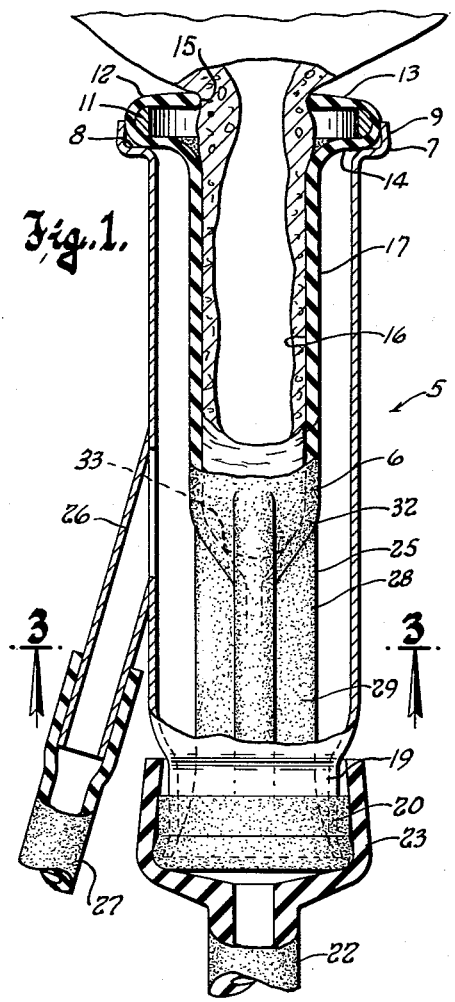
FIGURE 1 is a view partly in side elevation and partly in longitudinal section, of a teat cup incorporating the inflation of this invention, showing the same in place on a teat and in the open condition that obtains during the milking pulses.
Figure 2:
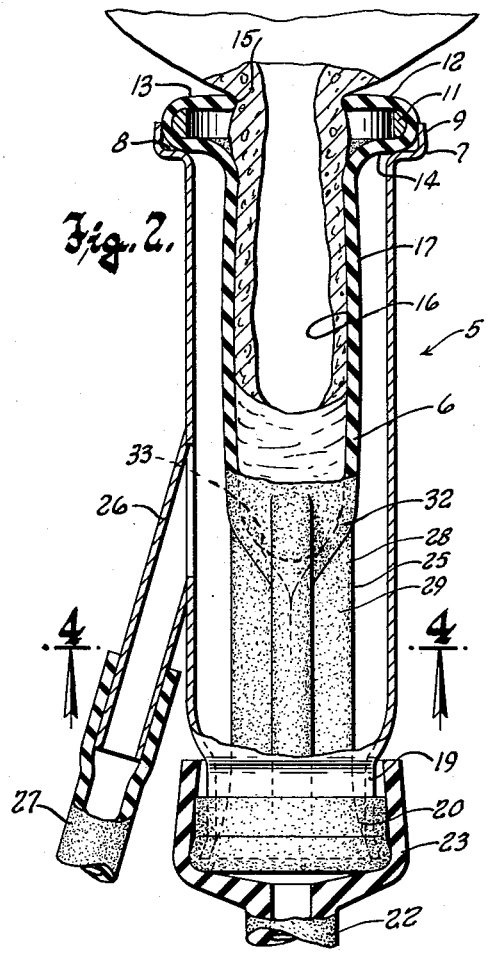
FIGURE 2 is a view similar to FIGURE 1 but showing the inflation, or more accurately, its portion beneath the teat end in the collapsed position that obtains during the massaging pulses.

Referring now more particularly to the accompanying drawings, in which like reference characters have been applied to like parts throughout the views, the numeral 5 generally designates the rigid cylindrical outer shell of a teat cup incorporating the inflation or liner 6 of this invention. As is customary, the shell is made of metal while the inflation is made of substantially soft rubber or the like having good flexibility and elasticity.

An enlarged circular rim portion 7 on the upper end of the shell provides an upwardly facing flat seat 8 normal to the axis of the shell, and an upstanding retaining flange 9 encircling the seat.

An expander ring 11 inserted into the upper end of the inflation in effect forms a head 12 thereon having an annular cushion top 13 and an underside 14 that bears flatwise upon the seat 8 on the rim portion 7, in sealing relation thereto. The central opening 15 in the cushion top 13 is substantially equal in diameter to that of the bore 16 in a tubular upper section 17 of the inflation so as to provide for entrance of the teat of an animal thereinto.

The lower end portion of the shell is reduced in diameter, as at 19, and flared outwardly to a slight extent at its extremity to enable an everted lower end portion 20 of the liner or inflation to be stretched thereover, in sealing relation to the lower end of the shell and retained against displacement by the flare. It will be understood that the liner must be stretched lengthwise when its lower end portion is engaged over the flared bottom portion of the shell so as to tightly and sealingly engage the underside 14 of the head on the upper end of the liner with the seat 8 on the top of the shell.

The milk tube 22 has an enlarged cuplike end portion 23 that is also stretched over the lower end portion of the shell, around the everted portion 20 of the liner or inflation, and, as usual, the tube is connectible with the vacuum producing mechanism, not shown, of a milking machine installation to enable the interior of the lower section 25 of the inflation to be maintained under vacuum of the desired uniform value.

A nipple 26 on the side of the shell provides for connection of the teat cup with a pulsator (not shown) through a pulsator tube 27, whereby the space in the cup around the inflation may be alternately maintained under vacuum and subjected to atmosphere air pressure in order to effect periodic collapse of the lower portion of the inflation and essential massage of a teat end.

In accordance with the objectives of this invention, the inflation or liner 6 acts to stabilize vacuum, to gently massage the teat end during the collapsing or massaging pulses, without danger of applying impact and/or pinching forces on the teat end, and to also promptly close the liner directly below the teat end during the massaging pulses to thereby briefly relieve the teat of suction during milking and to prevent pumping milk back into the teat canal after "milk let down" has ceased. These objectives are achieved by reason of the fact that the inflation or liner of this invention is so constructed that during the collapsing or massaging pulses of the liner it closes with only a slight inward motion of its walls at a zone immediately below the end of a teat therein, the massaging of the teat end being effected by the stretching of the adjacent wall of the liner caused by the closure of its lower portion.

Figure 3:
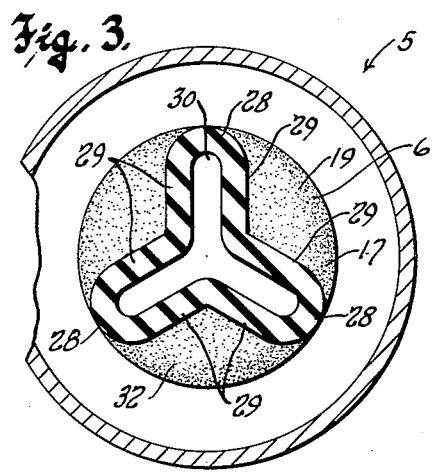
FIGURE 3 is a cross sectional view taken through FIGURE 1 on the plane of the line 3—3.

Referring particularly to the inflation shown in FIGURES 1 through 5, it will be seen that the upper section 17 of the liner is tubular and has a uniform diameter such as to snugly receive the teat of an animal therein. The lower or milk receiving section 25 of the liner, however, is defined by a plurality of straight, longitudinally extending hollow flutes 28. As seen in FIGURE 3, there are three such flutes, integrally joined together near the axis of the liner and projecting radially outwardly in equiangular relation.

The flutes are substantially flat and preferably have a uniform wall thickness substantially equal to that of the upper section 17 of the liner. The opposing side walls 29 of each flute are flat and parallel, and their normally flat inner surfaces 29' are spaced apart to define a narrow channel 30 between them. These spaces or channels 30 communicate with one another on the axis of the inflation.

If desired, the tubular upper section 17 of the inflation may be merged with the fluted lower section 25 by means of a junction 32 comprised of substantially spherically surfaced segments joined by the upper ends of the flutes. These segments cooperate to define an upwardly opening concavity 33 so spaced from the top of the upper section 17 that the shortest teats that might be encountered will reach the same. Longer teats will be accommodated by having these spherically surfaced segments and the fluted portion therebelow, yield and conform to the lower end of the teat. Thus, in all cases the wall of the inflation will closely hug not only the main body of the teat, but also the end thereof.

Figure 4:
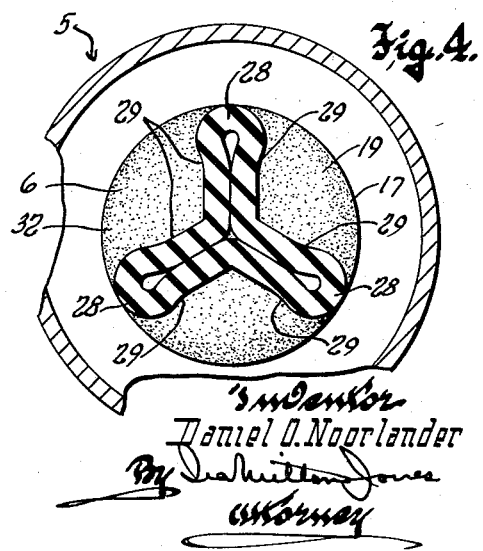
FIGURE 4 is a cross sectional view taken through FIGURE 2 on the plane of the line 4—4.

Because the spaces 30 between the normally flat inner surfaces 29' of the side walls of the flutes are very narrow, and the flat walls of the flutes are very readily flexed inwardly toward one another, a substantial length of the fluted portion of the inflation immediately beneath the teat end may become substantially completely closed, as indicated in FIGURE 4, upon only slight inward motion of the side walls of the flutes. Hence the flat walls of the flutes can readily respond to and compensate for vacuum fluctuations within the liner, and by their deflection tend to stabilize and maintain the vacuum at a constant value.

Because the walls of the fluted lower section of the liner can move only a small distance toward one another before they abut and close the milk receiving section during the massaging pulses, such slight movement of its walls toward one another and the resulting stretching of the liner portion in which the end of the teat is located can only effect a gentle massaging of the teat end. The teat end is, therefore, greatly relieved of injurious impact and pinching forces formerly imposed thereon with most past types of teat cup inflations.

In the same way that the walls of the fluted lower section are readily deformable inwardly, they can also be easily flexed outwardly to enable the lower milk receiving section of the inflation to be expanded by means of a cylindrical cleaning tool being run through the liner, and therefore all portions of the interior surface of the fluted section can be reached by such a tool and effectively cleaned despite the normally very narrow spaces or channels 30 between opposing flat walls of the flutes. For the same reason, the fluted section does not interfere with long teats extending into it or with eversion of the lower end portion thereof and engagement of the same over the lower end of the shell.

If desired, a liner or inflation embodying the principles of this invention may also be constructed as shown in FIGURE 6. As therein shown, the flutes 28 extend the entire length of the inflation, but it will be appreciated that when installed in the shell 5 of the teat cup in the manner illustrated in FIGURES 1 and 2, the end portions of the inflation will gradually diverge toward a circular cross sectional shape due to their connections with the circular ends of the shell. Because the fluted upper section of the liner is readily expandable, and has a wide entrance afforded by the reception of the expander ring 11 in its upper end, the upper section of the liner readily accommodates itself to the shape of an animal's teat received therein, and no difficulty is experienced in applying it to the teat.

The liner or inflation shown in FIGURE 7 is similar to that first described. It also has a smooth bore or tubular upper section 17, but its lower section 25 is formed to provide only a single narrow space or channel 30 defined by opposing flat walls 36 that extend substantially diametrically across the liner. The junction 32 between these flat walls with the tubular upper section 17, is close enough to the top of the inflation to assure short teats reaching all the way to the junction and thus reducing to a minimum the space inside the inflation directly below the teat end.

While the FIGURE 7 embodiment illustrates that inflations or liners embodying this invention can have less than three flutes, they may also be provided with more than three. One such embodiment, having four flutes, is shown in FIGURE 8. The flutes 28, in that case, are disposed 90° apart, but are in other respects similar to those of the first described embodiment of the invention.

From the foregoing description taken with the accompanying drawings, it will be readily apparent to those skilled in the art that this invention provides a teat cup inflation or liner for milking machines which is able to perform its massaging function on the teat of an animal in a manner that is noninjurious to the teat, particularly in that it avoids the imposition of impact and pinching forces upon the end of the teat and also tends to stabilize the vacuum inside the liner which is necessary for withdrawal of milk from the teat.

What is claimed as my invention is:

1. A teat cup inflation of resiliently flexible material, characterized by: a hollow milk receiving section having longitudinally extending walls with normally flat opposing internal surfaces that are spaced apart only a slight distance over substantially their entire area, so as to be capable of very quickly being brought into surface-to-surface engagement as a consequence of relatively slight inward movement of said walls due to the application of inflation collapsing force to their exteriors.

2. The teat cup inflation of claim 1, wherein the milk receiving section of the inflation has a number of pairs of such walls extending for the entire length of the section, each pair being angularly equidistant from its adjacent pairs and projecting radially from the axis of the inflation.

3. The teat cup inflation of claim 1 further characterized by: the provision of an upper teat receiving section which is tubular in shape and of a size and length to snugly receive the teat of an animal.

4. The teat cup inflation of claim 3, wherein said upper and lower sections of the inflation are connected by an intermediate section, the wall of which merges gradually with the walls of the upper and lower sections.

5. The teat cup inflation of claim 1 wherein said milk receiving section of the inflation is comprised of a number of flat-sided hollow flutes extending lengthwise of the inflation and projecting radially from the axis thereof, the opposite sides of each of said flutes providing a pair of said longitudinally extending walls.

6. The teat cup inflation of claim 5, wherein the milk receiving section has three of said flutes arranged angularly equidistant from one another.

7. The teat cup inflation of claim 1, wherein said walls extend diametrically across the milk receiving section of the inflation for its entire length and define therebetween a single substantially narrow central channel through which milk may be drawn.

8. A teat cup inflation of elastic material, comprising: an upper tubular teat receiving portion; a lower milk receiving portion joined to the lower end of the teat receiving portion and having walls with substantially flat opposing inner surfaces spaced apart only a slight amount to define a passage substantially smaller in cross sectional area than the interior of the upper tubular portion; and an intermediate junction portion joining said upper and lower portions, said intermediate junction portion having a cross sectional shape which gradually merges the lower portion with the upper tubular portion so that in the event the teat length is less than the length of the upper portion, the lower part of the upper portion below the end of the teat quickly collapses and takes the cross sectional shape of the lower milk receiving portion as a consequence of the imposition of inflation collapsing force thereto.

9. A teat cup comprising: a rigid shell having an enlarged upper end portion providing an upwardly facing seat; an inflation of elastic material inside the shell, having a lower end portion, the lower end of which has a sealed connection with the shell; an expander ring in the upper end of the inflation holding the same expanded into the enlarged upper end portion of the shell with a portion of the inflation sealingly engaged with said seat; said inflation having an upper teat receiving portion, and a milk receiving lower portion therebeneath; and opposing walls on said lower portion of the inflation having normally flat internal surfaces spaced apart only a slight distance over substantially their entire area, so as to be capable of very quickly being brought into surface-to-surface engagement closing the lower portion of the inflation in consequence of only slight inward motion of said walls.

References Cited in the file of this patent

UNITED STATES PATENTS

| | | |
|---|---|---|
| 766,846 | Sharples | Aug. 9, 1904 |
| 766,847 | Sharples | Aug. 9, 1904 |
| 1,486,182 | Frost | Mar. 11, 1924 |
| 2,502,956 | Jansson | Apr. 4, 1950 |